US007050636B2

(12) United States Patent
Gallagher et al.

(10) Patent No.: US 7,050,636 B2
(45) Date of Patent: May 23, 2006

(54) METHOD AND SYSTEM FOR IMPROVING AN IMAGE CHARACTERISTIC BASED ON IMAGE CONTENT

(75) Inventors: Andrew C. Gallagher, Brockport, NY (US); Walter E. Bruehs, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 584 days.

(21) Appl. No.: 10/020,031

(22) Filed: Dec. 7, 2001

(65) Prior Publication Data

US 2003/0108245 A1    Jun. 12, 2003

(51) Int. Cl.
*G06K 9/62* (2006.01)

(52) U.S. Cl. ............... 382/228; 382/254; 382/266; 382/263

(58) Field of Classification Search ........ 382/254–275, 382/205, 228
See application file for complete search history.

(56) References Cited

U.S. PATENT DOCUMENTS

| 4,203,671 | A |   | 5/1980  | Takahashi et al. ......... 356/402 |
| 5,682,443 | A | * | 10/1997 | Gouch et al. ............. 382/254 |
| 5,710,833 | A |   | 1/1998  | Moghaddam et al. ....... 382/228 |
| 5,781,276 | A |   | 7/1998  | Zahn et al. ............... 355/41 |
| 5,889,578 | A | * | 3/1999  | Jamzadeh ................. 355/41 |
| 6,282,317 | B1|   | 8/2001  | Luo et al. ................ 382/203 |
| 6,453,069 | B1| * | 9/2002  | Matsugu et al. ........... 382/173 |
| 6,707,940 | B1| * | 3/2004  | Qian ...................... 382/173 |
| 6,731,821 | B1| * | 5/2004  | Maurer et al. ............ 382/263 |
| 6,738,494 | B1| * | 5/2004  | Savakis et al. ........... 382/100 |
| 6,891,977 | B1| * | 5/2005  | Gallagher ................ 382/263 |
| 2003/0108250 | A1| * | 6/2003 | Luo et al. ................ 382/263 |

OTHER PUBLICATIONS

U.S. Appl. No. 09/450,190, filed Nov. 29, 1999, Luo et al.
U.S. Appl. No. 09/904,366, filed Jul. 12, 2001, Dupin et al.
"Finding Naked People" by Margaret M. Fleck, David A. Forsyth, and Chris Begler. Proceedings of the European Conference on Computer Vision, vol. 2, 1996, pp. 592-602.
"Face Detection in Still Gray Images" by Bernd Heisele, Tomaso Poggio, Massimiliano Pontil. MIT Artificial Intelligence Lab, Memo 1687, May 2000.
"Fundamentals of Digital Image Processing" by A.K. Jain, Prentice-Hall, 1989, pp. 249-251.
"Adaptive Skin-Color Filter" by Jyung-Min Cho, Jeong-Hun Jang, Ki-Sang Hong. Pattern Recognition, 34 (2001), pp. 1067-1073.
Computer Vision, Graphics and Image Processing, 24, pp. 255-269 (1983), "Digital Image Smoothing and the Sigma Filter", by Jong-Sen Lee.

* cited by examiner

*Primary Examiner*—Brian Werner
*Assistant Examiner*—Dennis Rosario
(74) *Attorney, Agent, or Firm*—David M. Woods

(57) ABSTRACT

In a method of improving a characteristic of an image according to its material content, where the image is comprised of image pixels, a belief map corresponding spatially to the image pixels is generated. The belief map includes belief values indicating the likelihood that respective pixels are representative of a particular material, such as flesh. An improvement parameter is generated from the belief map, and the improvement parameter is applied uniformly to the image pixels to improve the characteristic, such as the sharpness, of the image.

28 Claims, 3 Drawing Sheets

METHOD AND SYSTEM FOR IMPROVING AN IMAGE CHARACTERISTIC BASED ON IMAGE CONTENT

FIELD OF THE INVENTION

The invention relates generally to the field of digital image processing and, more particularly, to a method for relating a processing parameter to the contents of an image.

BACKGROUND OF THE INVENTION

In processing a digital image, it is common to sharpen the image and enhance fine detail with sharpening algorithms. Typically, this sharpening is performed by a convolution process (for example, see A. K. Jain, *Fundamentals of Digital Image Processing*, Prentice-Hall: 1989, pp. 249–251). The process of unsharp masking is an example of a convolution-based sharpening process. For example, sharpening an image with unsharp masking can be described with the equation:

$$s(x,y) = i(x,y)b(x,y) + \beta f(i(x,y) - i(x,y)b(x,y)) \qquad (1)$$

where:
  $s(x,y)$=output image with enhanced sharpness
  $i(x,y)$=original input image
  $b(x,y)$=lowpass filter
  $\beta$=unsharp mask scale factor
  $f(\ )$=fringe function
  ** denotes two dimensional convolution
  $(x,y)$ denotes the $x^{th}$ row and the $y^{th}$ column of an image Typically, an unsharp image is generated by convolution of the image with a lowpass filter (i.e., the unsharp image is given by $i(x,y)b(x,y)$). Next, the highpass, or fringe, data is generated by subtracting the unsharp image from the original image (i.e., the highpass data is found with $i(x,y)-i(x,y)b(x,y)$). This highpass data is then modified by either a scale factor $\beta$ or a fringe function $f(\ )$ or both. Finally, the modified highpass data is summed with either the original image or the unsharp image to produce a sharpened image.

A similar sharpening effect can be achieved by modification of the image in the frequency domain (for example, the FFT domain) as is well known in the art of digital signal processing. Both the space domain (e.g., convolution methods) and the frequency domain methods of enhancing image sharpness are shift invariant methods. In other words, the sharpening process is invariant to the location within the image.

While these methods do indeed produce sharpened images, the quality of the resulting image often varies depending on the image content. For example, using the unsharp mask algorithm may produce a pleasing result for an image of a building. However, using the same algorithm may result in the undesirable appearance of oversharpening for an image of a human face (e.g., blemishes may be enhanced). The scale factor parameter may be modified individually for each scene by a human operator, but this is an expensive process.

In U.S. Pat. No. 5,682,443, Gouch and MacDonald describe a method of modifying, on a pixel by pixel basis, the parameters associated with the unsharp mask. In essence, the constant scale factor $\beta$ in equation (1) is replaced with a scale factor which varies based on location $\beta(x,y)$. These parameters are varied based on the color of the pixels in a local neighborhood. The method allows for the de-emphasis of the detail for pixels which are approximately flesh colored. This method is not shift invariant, however, since the fringe data is modified with a weighting function determined in accordance with the values of the sharp or unsharp data for each of the color components of each pixel. Consequently, this method is computationally intensive because the filter parameters are varied for each pixel. Additionally, this method can produce switching artifacts when one region of an image is sharpened far more or less than a nearby region.

Therefore, there exists a need for quickly sharpening, or otherwise improving, an image whereby the overall improvement of the image can be adjusted based on the material content of the image, and without the production of switching artifacts.

SUMMARY OF THE INVENTION

The present invention is directed to overcoming one or more of the problems set forth above. Briefly summarized, according to one aspect of the present invention, a method of improving a characteristic of an image according to its material content comprises the steps of: providing an image comprised of image pixels; generating a belief map corresponding spatially to the image pixels, wherein the belief map includes belief values indicating the likelihood that respective pixels are representative of a particular material; generating an improvement parameter from the belief map, wherein the improvement parameter is applied uniformly to the image pixels; and using the improvement parameter to improve the characteristic of the image.

The present invention has the advantage that the global level of a particular characteristic of an image can be varied depending on the detected materials within the image. Where the characteristic is sharpness, rather than tuning a system to sharpen all images at a conservative level for fear of creating sharpening artifacts in some images, the system according to the present invention automatically determines the sharpening for each image, conservatively sharpening sensitive images and aggressively sharpening non-sensitive images. Specifically, the system of the present invention conservatively sharpens images in which human flesh is detected and aggressively sharpens images in which human flesh is not detected. In another aspect, the system according to the present invention conservatively reduces noise in areas of images where noise reduction can lead to objectionable artifacts, such as in images of vegetation, and aggressively reduces noise in images in which such sensitive material content is not detected.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, an embodiment of the present invention will be described as a method implemented as a software program. Those skilled in the art will readily recognize that the equivalent of such software may also be constructed in hardware. Because image enhancement algorithms and methods are well known, the present description will be directed in particular to elements forming part of, or cooperating more directly with, the method and system in accordance with the present invention. Other elements, and hardware and/or software for producing and otherwise processing the image signals, not specifically shown or described herein, may be selected from such materials, components and elements known in the art. Given the system and method as shown and described according to the invention in the following materials, software not specifically shown, described or suggested herein that is useful for implementation of the invention is conventional and within the ordinary skill in such arts.

Still further, as used herein, the computer program may be stored in a computer readable storage medium, which may comprise, for example, magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

A digital image is typically a two-dimensional array of numbers representing red, green, and blue pixel values or monochrome pixel values corresponding to light intensities. With regard to matters of nomenclature, the value of a pixel of a digital image located at coordinates (x,y), referring to the $x^{th}$ row and the $y^{th}$ column of a digital image, shall herein comprise a triad of values [r(x,y), g(x,y), b(x,y)] respectively referring to the values of the red, green and blue digital image channels at location (x,y). In this regard, a digital image may be considered as comprising a certain number of digital image channels. In the case of a digital image comprising red, green and blue two-dimensional arrays, the image comprises three channels, namely, red, green and blue spectral channels.

Figure 1:
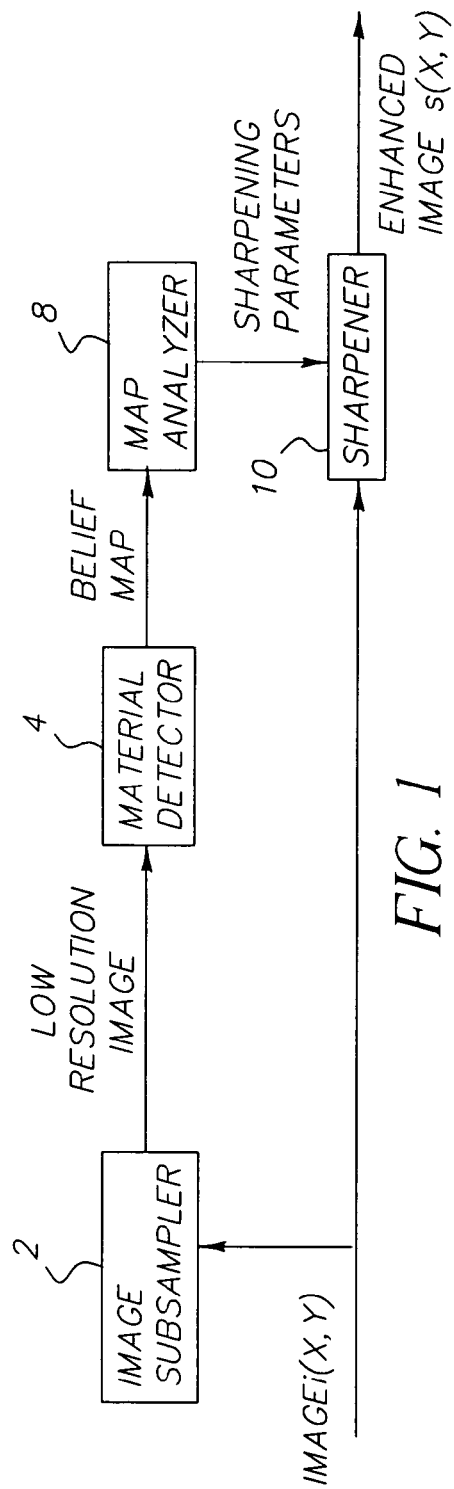
FIG. 1 is a block diagram illustrating a technique for improving an image according to a first embodiment of the invention.

Referring initially to FIG. 1, a first embodiment of the present invention is illustrated for processing an image with a specific image processing path in order obtain an enhanced output image. In general, the present invention performs a shift invariant improvement to an image, the magnitude of the improvement being determined by the material content of objects within the image. Thus, the improvement applied to successive images may vary depending on the image content. The magnitude of the improvement applied to any particular image is selected in order to be appropriate for the image content. In the first embodiment shown in FIG. 1, the present invention performs a shift invariant sharpening to an image, the magnitude of the sharpening being determined by the objects within the image. Thus, the sharpening applied to successive images may vary depending on the image content, and the magnitude of the sharpening applied to any particular image is selected in order to be appropriate for the image content.

FIG. 1 illustrates an image i(x,y) having $x_o$ rows and $y_o$ columns that is input to an image subsampler 2 for reducing the number of pixels contained in the image and therefore decreasing the processing time required by the present invention to determine the sharpening parameter. Preferably, the image i(x,y) is of high resolution, for example, an illustrative high resolution image would have $x_o=1024$ rows of pixels by $y_o=1536$ columns of pixels. The image output from the image subsampler 2 is a low resolution image having $m_o$ rows and $n_o$ columns, for example, an illustrative low resolution image would have $m_o=128$ and $n_o=192$ pixels. The image subsampler 2 preferably performs a block averaging process over w×w pixel blocks (for example, w=8 (corresponding to the preceding illustrative examples)) in order to produce the low resolution image output from the image subsampler 2. Many other methods of creating small images from larger images are known in the art of image processing and can be used as the image subsampler 2. (The preceding examples are not intended as a limitation; in fact, the image subsampler may be omitted if the additional processing can be tolerated.)

The image output from the image subsampler 2 is then input to a material detector 4 for the creation of a belief map, indicating the belief that particular pixels or regions of pixels represent a given target material. The target material is selected as the material to which the image sharpening is sensitive. The material detector 4 outputs a belief map M(m,n), preferably having the same pixel dimensions in terms of rows and columns as the image input to the material detector 4. The belief map indicates the belief that particular pixels represent the target material. The belief is preferably represented as a probability. For example, each pixel value M(m,n) is equal to 100*P(that pixel (m,n) of the low resolution image represents target material), where P(A) represents the probability of event A. Alternatively, each pixel value M(m,n) may represent a binary classification indicating belief. For instance, a pixel value of 1 in the belief map may represent the belief that the pixel represents the target material and a pixel value of 0 may represent the belief that the pixel does not represent the target material. In the preferred embodiment, the target material is human flesh. In commonly-assigned, copending U.S. Ser. No. 09/904,366, entitled "A Method for Processing a Digital Image to Adjust Brightness" and filed on Jul. 12, 2001 in the names of M. W. Dupin and J. Luo, a method is described of creating a belief map indicating the belief for a target material of flesh. Additionally, methods of creating belief maps for a target material of human flesh are described in the following articles: K. Cho, J. Jang, K. Hong, "Adaptive Skin-Color Filter," *Pattern Recognition,* 34 (2001) 1067–1073; and M. Fleck, D. Forsyth, C. Bregler, "Finding Naked People," *Proceedings of the European Conference on Computer Vision,* Vol. 2, 1996, pp. 592–602.

The method described in commonly-assigned, copending U.S. Ser. No. 09/904,366 that can be used for the regions of skin-tone can be summarized as follows. The pixel RGB values of an image are converted to "Lst" coordinates by the following equations:

$L(R+G+B)/sqrt(3)$ $s=(R-B)/sqrt(2)$ $t=(2G-R-B)/sqrt(6)$

For each pixel in the input color digital image, the probability that it is a skin-tone pixel is computed. The probability is derived from its coordinates in the Lst space, based on predetermined skin-tone probability functions. These probability functions were constructed based on collection of data for the color-space distributions of skin and non-skin regions in a large collection of scene balanced images. The conditional probability that a pixel is a skin-tone pixel given its Lst coordinates is:

$$Pr(Skin|L,s,t)=Pr(Skin|L)*Pr(Skin|s)*Pr(Skin|t)$$

where each of the conditional distributions Pr(Skin|L), Pr(Skin|s), and Pr(Skin|t) are constructed by application of Bayes Theorem to the original training distributions for skin and non-skin pixels. Further details of this methodology can be found in the aforementioned commonly-assigned, copending U.S. Ser. No. 09/904,366, which is incorporated herein by reference. In comparison, there are other conventional methods for detecting skin-tone colored pixels, e.g., U.S. Pat. No. 4,203,671 (Takahashi) and U.S. Pat. No. 5,781,276 (Zahn) use the likelihood probability of P(color|Skin). However, one drawback of using the conventional likelihood probability is that the probability distribution of non skin-tone pixels is not accounted for. Consequently, there is a higher likelihood for false detection.

The collection of probabilities for all pixels forms a skin-tone probability distribution for the input image. The skin-tone probability distribution is thresholded to create a binary map such that each pixel is designated as either skin-tone or non skin-tone. Alternatively, a face detection algorithm can be initially used to find human face regions in the input color digital image. Thereupon, regions of skin-tone colors may be extracted from the detected face regions. For a description of a face detection method, see U.S. Pat. No. 5,710,833 by Moghaddam and Pentland (entitled "Detection, Recognition and Coding of Complex Objects Using Probabilistic Eigenspace Analysis").

Figure 2:
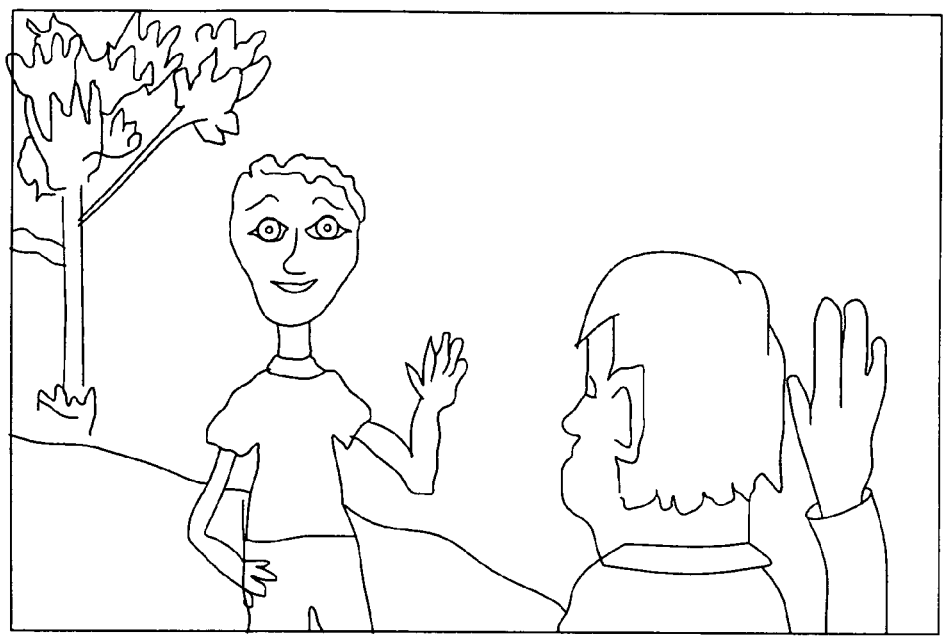
FIG. 2 is an example of the type of image processed according to the image improvement technique shown in FIG. 1.
Figure 3:
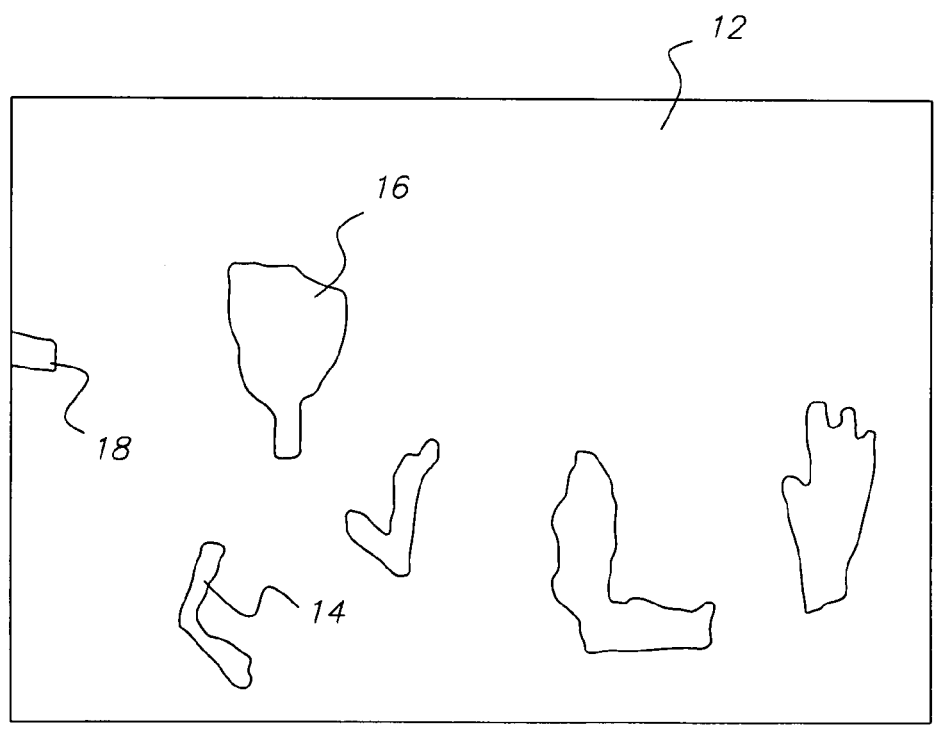
FIG. 3 is an example of a belief map generated according to the image improvement technique shown in FIG. 1 for the image shown in FIG. 2 when the target material is human flesh.

An example of the methodology is shown in FIGS. 2 and 3, where FIG. 2 shows an image of several people and FIG. 3 shows the associated belief map, when the target material is human flesh. The background 12 of the image is made up of the pixels having a belief of zero that the corresponding pixel in the low resolution image represents the target material (human flesh). If the material detector 4 detects that all pixels of the low resolution image have low probability of representing the target material, then the entire belief map will be background 12 (all zeros in the preferred encoding). FIG. 3 shows several regions made up of pixels having nonzero belief. For example, region 16 corresponds to a face in the low resolution image, and for example may have a high belief value of 95. Region 14 corresponds to an arm, and may have a belief value of 60. Region 18 incorrectly has a belief value of 40, indicating a belief that the tree branch may be human flesh. Such an incorrect belief value is a false positive. Generally, automatic detection algorithms such as the material detector 4 produce false positives such as region 18 as well as false negatives, (e.g. incorrectly classifying genuine flesh pixels as background 12).

Alternatively, the target material could be the material content of other types of objects in the image, such as human faces, sky, or any other material for which an automated method exists for determining material belief from an image. Human face detection is described in many articles, for example, see B. Heisele, T. Poggio, M. Pontil, "Face Detection in Still Gray Images," *MIT Artificial Intelligence Lab*, Memo 1687, May 2000. In addition, commonly-assigned copending U.S. Ser. No. 09/450,190 (entitled "Method for Detecting Sky in Images" and filed Nov. 29, 1999 in the names of J. Luo and S. Etz) describes the creation of belief maps when the target material is blue sky.

The belief map is then input to a map analyzer 8. The map analyzer 8 analyses the belief map and outputs the recommendation for the sharpening of the image as one or more sharpening parameters. A sharpening parameter is any parameter which directly relates to the level or strength of sharpening applied to an image. In the preferred embodiment, the map analyzer 8 outputs a scale factor β derived from an analysis of the belief map. In general, the sharpening parameters are a function of the belief map. In the preferred embodiment, the scale factor β is a function of the belief map M(m,n) and is preferably derived as follows:

$$\beta = \left(\beta_{material} - \beta_{non\text{-}material}\right) 0.01 \max_{x,y} M(x, y) + \beta_{non\text{-}material}$$

where:
  $\beta_{material}$ is the ideal sharpening scale factor for images of the target material; and
  βnon-material is the ideal sharpening scale factor for images not containing the target material.

As previously mentioned, the target material is preferably human flesh. Therefore, $\beta_{material}$ is the ideal sharpening level for images containing flesh. Preferably, $\beta_{material}=1.5$, and $\beta_{non\text{-}material}=5$ because generally non-flesh images can be satisfactorily sharpened by greater amounts than images containing flesh. In this example, the scale factor β is determined based on the maximum belief of flesh contained in the belief map. Note that $\beta_{material}$ and $\beta_{non\text{-}material}$ may themselves be functions of characteristics of the image or the imaging system. For example, $\beta_{material}$ and $\beta_{non\text{-}material}$ may be decreased for high speed films because of grain.

Figure 4:
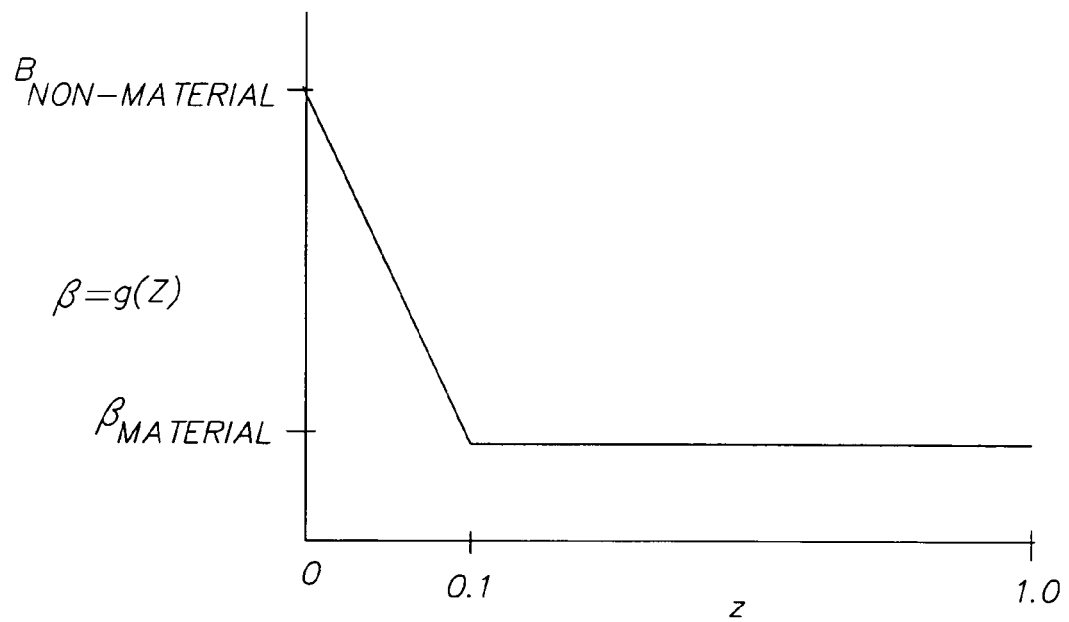
FIG. 4 is a representation of a function g(z) used to determine a scale factor β for the image improvement technique shown in FIG. 1.

Alternatively, the scale factor may be determined based on other characteristics of the belief map. For example, the scale factor β may be calculated based on the fraction of the belief map that has a specific belief. For example:

$$\beta = g(z)$$

where:

$$z = \frac{1}{x_o y_o} \sum_{x,y} M(x, y);$$

and
  g(z) is a function used to convert the average value of the belief map into the scale factor β. An example of the function g(z) is shown in FIG. 4.

Alternatively, the scale factor may be determined based on other characteristics of the belief map. It has been observed that large flesh areas are most sensitive to the oversharpening because blemishes quickly become apparent.

However, when the flesh regions are small, generally the image can be sharpened more without the appearance of objectionable artifacts. As shown in FIG. 3, the preferred material detector 4 is described in the aforementioned commonly-assigned, copending U.S. Ser. No. 09/904,366, where Dupin and Luo return a belief map generally consisting of a background area 12 wherein all pixels have a value of 0 indicating the probability that the pixels represent the target material (human flesh) is estimated to be 0. Also, several foreground regions 14, 16, and 18 are shown wherein the belief map indicates a constant, non-zero belief that the pixels represent the target material for all pixels belonging to those regions. By using a connected component algorithm such as is well known in the art of image processing, each belief region having non-zero belief may be extracted from the belief map. In the example shown in FIG. 3, the size of region 16 is greater than the size of region 14 which is greater than the size of region 18. The size of each belief region may be determined by any number of methods, including one of the several methods described herein. For instance, the size may be determined by counting the number of pixels belong to each belief region. Alternatively, (and preferably) the size may be determined by taking the product of the number of pixels belonging to each belief region and the associated value within the belief map of each belief region. The value of the sharpening parameter is then a function of the belief region sizes. For example, $$\beta = h(z)$$

where:

$$z = \frac{1}{x_o y_o} \max_i R_i;$$

Figure 5:
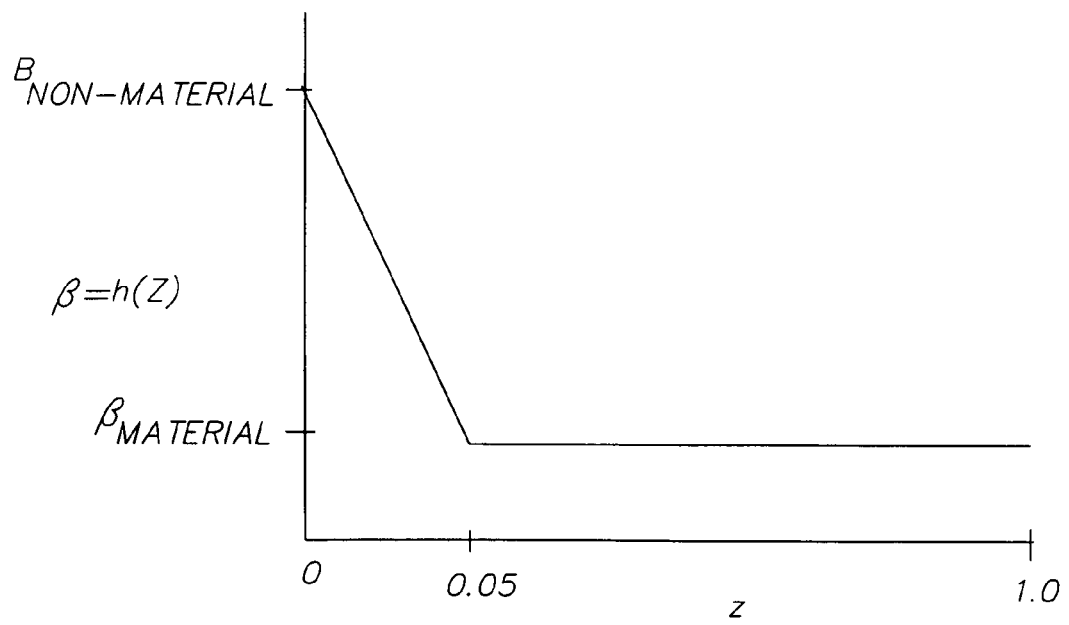
FIG. 5 is a representation of another function h(z) used to determine a scale factor β for the image improvement technique shown in FIG. 1.

$R_i$ is the size of belief region i: and
h(z) is a function used to convert the average value of the belief map into the scale factor $\beta$. An example of the function h(z) is shown in FIG. 5.

The sharpening parameter(s) $\beta$ determined by the map analyzer 8 is then input to a sharpener 10. While in the present embodiment of the invention the sharpening parameter is the scale factor $\beta$, the function of the map analyzer 8 is without such limitation and other sharpness related determinations would be evident to those of ordinary skill in the art. For example, the filter used in the sharpening convolution performed by the sharpener 10 could be determined by the map analyzer 8 based on an analysis of the belief map.

The sharpener 10 inputs the sharpening parameter(s) and applies a sharpening algorithm to the image, utilizing the sharpening parameter(s) in order to produce an enhanced output image having improved sharpness without producing objectionable sharpness artifacts. In the preferred embodiment, the sharpener 10 applies an unsharp masking algorithm to the image using the determined value of $\beta$ in order to produce the enhanced image. For example, sharpening an image according to the invention can be performed by use of the presently-described sharpening parameter(s) $\beta$ in the aforementioned unsharp masking equation (1):

$$s(x,y)=i(x,y)b(x,y)+\beta f(i(x,y)-i(x,y)b(x,y))$$

where:
s(x,y)=output image with enhanced sharpness;
i(x,y)=original input image;
b(x,y)=lowpass filter;
f( )=fringe function;
** denotes two dimensional convolution;
(x,y) denotes the $x^{th}$ row and the $y^{th}$ column of an image; and
$\beta$=the scale factor determined by the map analyzer 8.

Those skilled in the art will recognize that there are several methods by which unsharp masking (such as provided by Eq. (1)) can be applied to a color image having multiple channels. For example, the unsharp mask process can be applied to each channel of the color image. Preferably, the unsharp mask process is applied in the following manner, commonly known in the art:

Assuming the input image is a color image consisting of red, green, and blue color channels, a matrix is first applied to the image in order to produce a luminance channel and two or more color difference channels. Next the unsharp mask process is applied to the luminance channel. Finally, an inverse matrix is applied to the several channels, generating an enhanced color image.

Additionally, the unsharp mask process may be applied to only a single image channel (e.g. the green channel), and the modified fringe data may be summed with each color channel in order to generate an enhanced color image. These and other similar modifications and enhancements to the unsharp mask process would be well understood by those of skill in this art. Since the particularities of their usage are not fundamentally related to the method of selecting sharpening parameters for a shift invariant sharpening, their particular application does not act to in any way limit the scope of the invention.

Those skilled in the art will also recognize that although Eq. (1) and the present invention generally describe the sharpening applied to the image as being performed by an unsharp mask, that is not necessarily the case. Assuming the fringe function f( ) of Eq. (1) is identity, the unsharp mask process can always be reconfigured as a single filter than can be applied with convolution to the image and produce results identical to the unsharp mask. For example, suppose the filter coefficients of b(x,y) are given as:

$$b(x, y) = \frac{\begin{bmatrix} 1 & 2 & 1 \\ 2 & 4 & 2 \\ 1 & 2 & 1 \end{bmatrix}}{16}.$$

Application of a filter c(x,y) with a convolution having coefficients given as $$c(x, y) = \frac{\begin{bmatrix} 1-\beta & 2(1-\beta) & 1-\beta \\ 2(1-\beta) & 4(1+3\beta) & 2(1-\beta) \\ 1-\beta & 2(1-\beta) & 1-\beta \end{bmatrix}}{16}$$

will produce identical results compared with using filter b(x,y) in the unsharp mask of Equation (1). Such modifications to the preferred embodiment by the grouping of operations in the sharpener 10 such as can be determined by methods well known in algebra and digital signal processing will be evident to those of skill in this art and are within the scope of the present invention.

Figure 6:
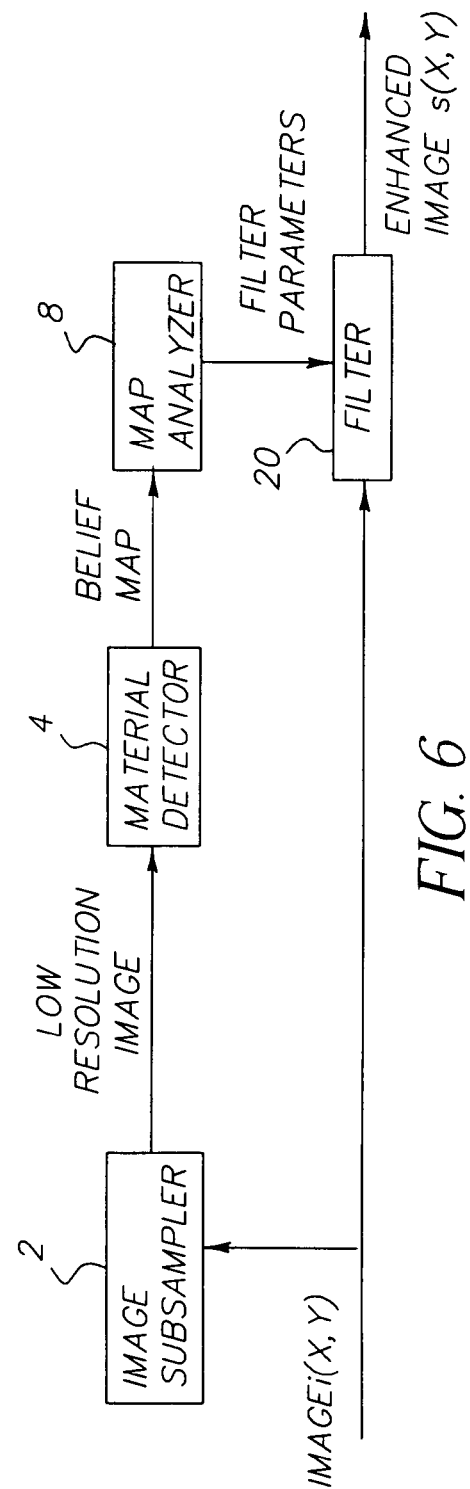
FIG. 6 is a block diagram illustrating a technique for improving an image according to a second embodiment of the invention.

An alternative embodiment to the present invention is shown in FIG. 6. In this embodiment, a filter 20 is applied according to a parameter determined by the map analyzer 8. The filter is applied uniformly across the image pixels, according to the filter parameter output from the map analyzer 8. In this embodiment, the image characteristic is not sharpness and the filter is not a sharpening filter. Rather, the image characteristic is related to another type of improvement and the filter is another type of filter, for example the image characteristic is noise and the filter is a noise reduction filter. Noise reduction filters are well described in the art of image processing. For example, Jong-Sen Lee describes the sigma filter in the paper "Digital Image Smoothing and the Sigma Filter," *Computer Vision, Graphics, and Image Processing*, 24, 255–269, 1983. The sigma filter replaces a central pixel of a neighborhood with all those pixels within Δ code values of intensity from the central pixel. The parameter Δ may be selected by the map analyzer 8 in a manner similar to the way that the parameter β was determined. The material content that is analyzed may be the same as that analyzed for sharpness, or it may be some other material content especially sensitive to noise. For example, when the target material is vegetation, the map analyzer 8 may output a small value of Δ for images containing regions having high belief and large value of Δ for images having no regions with high belief.

The present invention has been described with reference to a preferred embodiment. Changes may be made to the preferred embodiment without deviating from the scope of the present invention.

Parts List

2 Image subsampler
4 material detector
8 map analyzer
10 sharpener
12 background region
14 belief region
16 belief region
18 false positive belief region
20 filter

What is claimed is:

1. A method of improving a characteristic of an image according to its material content, said method comprising the steps of:
    providing an image comprised of image pixels;
    generating a belief map corresponding spatially to the image pixels, wherein the belief map includes belief values indicating the likelihood that respective pixels are representative of a particular material;
    generating an improvement parameter from the belief values of the belief map, wherein the improvement parameter is proportional to the belief values and applied uniformly to the image pixel; and
    using the improvement parameter to improve the characteristic of the image;
    wherein the belief values are grouped spatially into different sized regions of similar belief values and the improvement parameter is proportional to the size of at least one of the regions.

2. The method as claimed in claim 1 wherein the characteristic is sharpness and the improvement parameter is a sharpening parameter.

3. The method as claimed in claim 2 wherein the step of using the improvement parameter comprises performing sharpening with an unsharp mask operation.

4. The method as claimed in claim 3 wherein the sharpening parameter is a scale factor used in the unsharp mask operation.

5. The method as claimed in claim 1 wherein the characteristic is noise and the improvement parameter is a noise parameter.

6. The method as claimed in claim 5 wherein the step of using the improvement parameter comprises performing noise reduction with a sigma filter.

7. The method as claimed in claim 1 wherein the step of generating a belief map comprises the steps of:
    detecting pixels that represent the particular material; and
    producing a belief map from the detected pixels.

8. The method as claimed in claim 1 wherein the particular material is selected from the group consisting of faces, flesh, sky, and vegetation and the improvement parameter conditions the amount of improvement upon a characteristic of the belief values in the belief map that represent the particular material.

9. The method as claimed in claim 1 wherein the improvement parameter is proportional to a maximum belief value.

10. The method as claimed in claim 1 wherein the improvement parameter is proportional to an average belief value.

11. The method as claimed in claim 1 wherein the belief map is generated from a low resolution version of the image.

12. The method as claimed in claim 1 wherein the belief map is generated from a sub-sampled version of the image.

13. The method as claimed in claim 1 wherein the image is a color image comprised of a plurality of separate signal channels and the belief map is generated from a selected signal channel.

14. A computer readable program product stored on a computer readable medium for performing the method claimed in claim 1.

15. A method of improving the sharpness of an image according to its material content, said method comprising the steps of:
    providing an image comprised of image pixels;
    generating a belief map corresponding spatially to the image pixels, wherein the belief map includes belief values indicating the likelihood that respective pixels are representative of a particular material;
    generating a sharpening parameter from the belief map; and
    using the sharpening parameter to sharpen the image, wherein the sharpening parameter is applied uniformly to the image pixels;
    wherein the belief values are grouped spatially into different sized regions of similar belief values and the sharpening parameter is proportional to the size of at least one of the regions.

16. The method as claimed in claim 15 wherein the step of generating a belief map comprises the steps of:
    detecting pixels that represent a selected material; and
    producing a belief map from the detected pixels.

17. The system as claimed in claim 15 wherein the value of the improvement parameter is proportional to one of:
    (a) a maximum belief value; and
    (b) an average belief value.

18. A computer readable program product stored on a computer readable medium for performing the method claimed in claim 15.

19. A system for improving a characteristic of an image according to its material content, said system comprising:
    an image generator providing an image comprised of image pixels;
    a material detector generating a belief map corresponding spatially to the image pixels, wherein the belief map includes belief values indicating the likelihood that respective pixels are representative of a particular material;

a map analyzer grouping the belief values spatially into different sized regions of similar belief values and generating an improvement parameter from the belief values of the belief map, wherein the improvement parameter is proportional to the size of at least one of the regions and applied uniformly to the image pixels; and a processor using the improvement parameter to improve the characteristic of the image.

20. The system as claimed in claim 19 wherein the characteristic is sharpness and the improvement parameter is a sharpening parameter.

21. The system as claimed in claim 19 wherein the characteristic is noise and the improvement parameter is a noise parameter.

22. The system as claimed in claim 19 wherein the material detector detects pixels that represent the particular material and produces a belief map from the detected pixels.

23. The system as claimed in claim 19 wherein the image generator provides a low resolution version of the image and the belief map is generated from the low resolution version.

24. The system as claimed in claim 19 wherein the image generator provides a sub-sampled version of the image and the belief map is generated from the sub-sampled version.

25. The system as claimed in claim 19 wherein the image generator provides a color image comprised of a plurality of separate signal channels and the belief map is generated from a selected signal channel.

26. A system for improving a characteristic of an image according to its material content, said system comprising:

an image generator providing an image comprised of image pixels;

a material detector generating a belief map corresponding spatially to the image pixels, wherein the belief map includes belief values indicating the likelihood that respective pixels are representative of a particular material;

a map analyzer grouping the belief values spatially into different sized regions of similar belief values and generating an improvement parameter from the belief values of the belief map, the improvement parameter having a value defining an amount of improvement; and a processor using the improvement parameter to improve the characteristic of the image;

wherein the belief values are grouped spatially into different sized regions of similar belief values and the sharpening parameter is proportional to the size of at least one of the regions.

27. The system as claimed in claim 26 wherein the value of the sharpening parameter is proportional to a maximum belief value.

28. The system as claimed in claim 26 wherein the value of the sharpening parameter is proportional to an average belief value.

* * * * *